(12) United States Patent
Fujiyoshi et al.

(10) Patent No.: US 8,107,265 B2
(45) Date of Patent: Jan. 31, 2012

(54) CURRENT BALANCED PUSH-PULL INVERTER CIRCUIT WITH REGENERATION SNUBBER CIRCUIT AND VOLTAGE BOOST SECTION

(75) Inventors: Toshikazu Fujiyoshi, Osaka (JP); Hajime Katsushima, Osaka (JP); Kenji Morimoto, Osaka (JP); Satoshi Yamamura, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 53 days.

(21) Appl. No.: 12/864,267

(22) PCT Filed: Jan. 30, 2009

(86) PCT No.: PCT/JP2009/051567
§ 371 (c)(1),
(2), (4) Date: Jul. 23, 2010

(87) PCT Pub. No.: WO2010/086995
PCT Pub. Date: Aug. 5, 2010

(65) Prior Publication Data
US 2011/0049989 A1 Mar. 3, 2011

(51) Int. Cl.
*H02M 3/335* (2006.01)
*H02M 7/538* (2007.01)
(52) U.S. Cl. .......... 363/24; 363/17; 363/56.08; 363/133
(58) Field of Classification Search .............. 363/16, 363/17, 24, 25, 26, 56.06, 56.08, 98, 132, 363/133, 134
See application file for complete search history.

(56) References Cited

U.S. PATENT DOCUMENTS

| 4,797,630 | A | * | 1/1989 | Brown | 330/264 |
| 4,926,302 | A | * | 5/1990 | Harada et al. | 363/16 |
| 6,018,203 | A | * | 1/2000 | David et al. | 307/52 |
| 6,914,788 | B2 | * | 7/2005 | Fujiyoshi et al. | 363/16 |
| 7,130,205 | B2 | * | 10/2006 | Peng | 363/140 |

FOREIGN PATENT DOCUMENTS
JP 51-133731 A 11/1976
(Continued)

OTHER PUBLICATIONS

International Search Report for corresponding International Application No. PCT/JP2009/051567 dated Apr. 20, 2009.
(Continued)

*Primary Examiner* — Gary L Laxton
*Assistant Examiner* — Zekre Tsehaye
(74) *Attorney, Agent, or Firm* — Renner, Otto, Boisselle & Sklar, LLP (57) ABSTRACT

This inverter circuit includes two switching elements which are turned alternately ON and OFF, and a first primary winding connected in series between these switching elements, and also includes an output transformer having a secondary winding for obtaining an output voltage. This inverter circuit also includes a first voltage source and a second voltage source. The first voltage source applies a voltage to the first switching element via the first primary winding. And the second voltage source applies a voltage to the second switching element via the second primary winding. This inverter circuit also includes a regeneration snubber circuit for regenerating charge accumulated in a snubber capacitor. The regeneration snubber circuit includes a regeneration circuit including a voltage boost section which converts the primary side voltage of the output transformer to a predetermined voltage, which it outputs.

5 Claims, 12 Drawing Sheets

FOREIGN PATENT DOCUMENTS

| | | |
|---|---|---|
| JP | 02-254971 A | 10/1990 |
| JP | 09-046144 A | 2/1997 |
| JP | 2001-112253 A | 4/2001 |
| JP | 2001-224172 A | 8/2001 |
| JP | 2002-305897 A | 10/2002 |
| JP | 2005-279774 A | 10/2005 |
| JP | 2007-151225 A | 6/2007 |

OTHER PUBLICATIONS

International Search Report for corresponding International Application No. PCT/JP2009/051567 dated Apr. 28, 2009 and English translation (previously submitted with application on Jul. 23, 2010 in Japanese language).

* cited by examiner

CURRENT BALANCED PUSH-PULL INVERTER CIRCUIT WITH REGENERATION SNUBBER CIRCUIT AND VOLTAGE BOOST SECTION

TECHNICAL FIELD

The present invention relates to a DC-DC converter circuit which is provided with an inverter circuit of a novel structure on the primary side of its transformer, and which is different from an inverter circuit such as a full bridge type or a half bridge type or the like.

BACKGROUND ART

Figure 5:
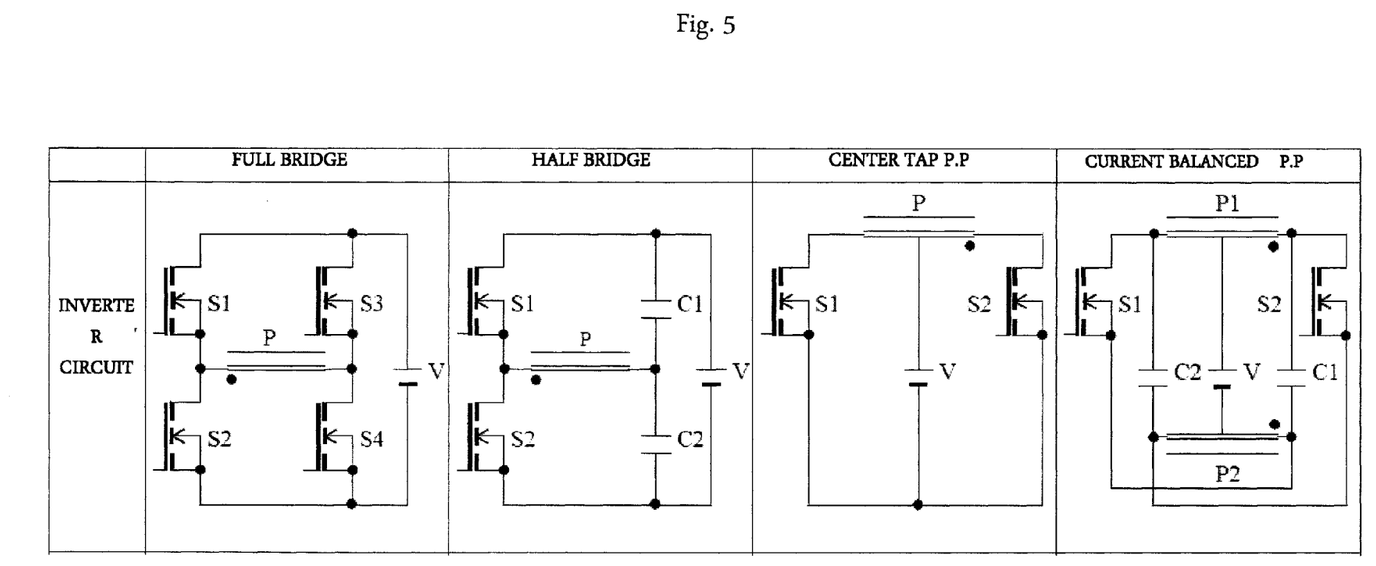
FIG. 5 is a figure showing the concepts of various inverter circuits: a full bridge type, a half bridge type, a center tap push pull type, and a current balanced push pull type.

Inverter circuits which are well known from the prior art are a full bridge type inverter circuit, a half bridge type inverter circuit, and a center tap push pull type inverter circuit. Illustrations of the concepts of these inverter circuits are shown in FIG. 5.

The full bridge type has a structure in which switching elements S1 through S4 are connected in a bridge pattern, and a power supply V is connected across the bridge. The switching elements S1 and S4, and the switching elements S2 and S3, are alternately turned ON and OFF, so that an alternating current flows in a primary winding P of an output transformer (refer to Patent Document #1).

In the half bridge type, switching elements S1 and S2 are respectively connected to voltage sources C1 and C2, and the power supply V is connected between these voltage sources C1 and C2. The switching elements S1 and S2 are alternately turned ON and OFF, so that an alternating current flows in the primary winding P (refer to Patent Document #2).

In the center tap push pull type, the power supply V is connected to a center tap of the primary winding P, which is connected between switching elements S1 and S2. The switching elements S1 and S2 are alternately turned ON and OFF, so that an alternating current flows in the primary winding P (refer to Patent Document #3).

Moreover snubber circuits which include snubber capacitors and snubber resistors are usually provided to these inverter circuits, so that surge voltages are not applied to their switching elements.

patent document #1: Japanese Laid-Open Patent Publication 2007-151225;
patent document #2: Japanese Laid-Open Patent Publication 2005-279774;
patent document #3: Japanese Laid-Open Patent Publication 2001-112253.

DISCLOSURE OF INVENTION

Problems to be Solved by the Invention

However, the various types of inverter circuit described above are subject to the following inconveniences.

(1) The full bridge type
The cost becomes high, since four switching elements are used.

(2) The half bridge type
While two switching elements suffice, the currents which flow in each of the switching elements S1 and S2, and in the primary winding P, are twice as great, as compared with the full bridge type or the center tap push pull type. Due to this, increase in the size and high price of the switching elements and the transformed cannot be avoided.

(3) The center tap push pull type
Two switching elements suffice, and the currents which flow in each of the switching elements S1 and S2, and in the primary winding P, is not as great as in the case of the full bridge type. However, since the power supply V is connected to the center tap upon the primary winding P, accordingly a leakage inductance is interposed into the combination of the left and right sides of the winding P. Due to this, via the above described leakage inductance, the surge voltage that is generated when the first switching element is turned OFF is clamped by a free wheel diode connected to the second switching element. Since the above described leakage inductance is present, perfect clamping is not possible, and the inconvenience arises that an excessively great surge voltage is applied to the first switching element.

Furthermore, with a CR snubber circuit, since the charge accumulated in the snubber capacitor is consumed by the snubber resistor as heat, accordingly there is the problem that the efficiency of the circuit is bad.

The object of the present invention is to provide a DC-DC converter circuit in which, to the primary side of a transformer, there is provided an inverter circuit for which two switching elements suffice and also the values of the currents which flow in these switching elements are low, in which no excessively great surge voltage is applied to the switching elements, and which moreover has high efficiency.

Means for Solving Problem

Figure 1:
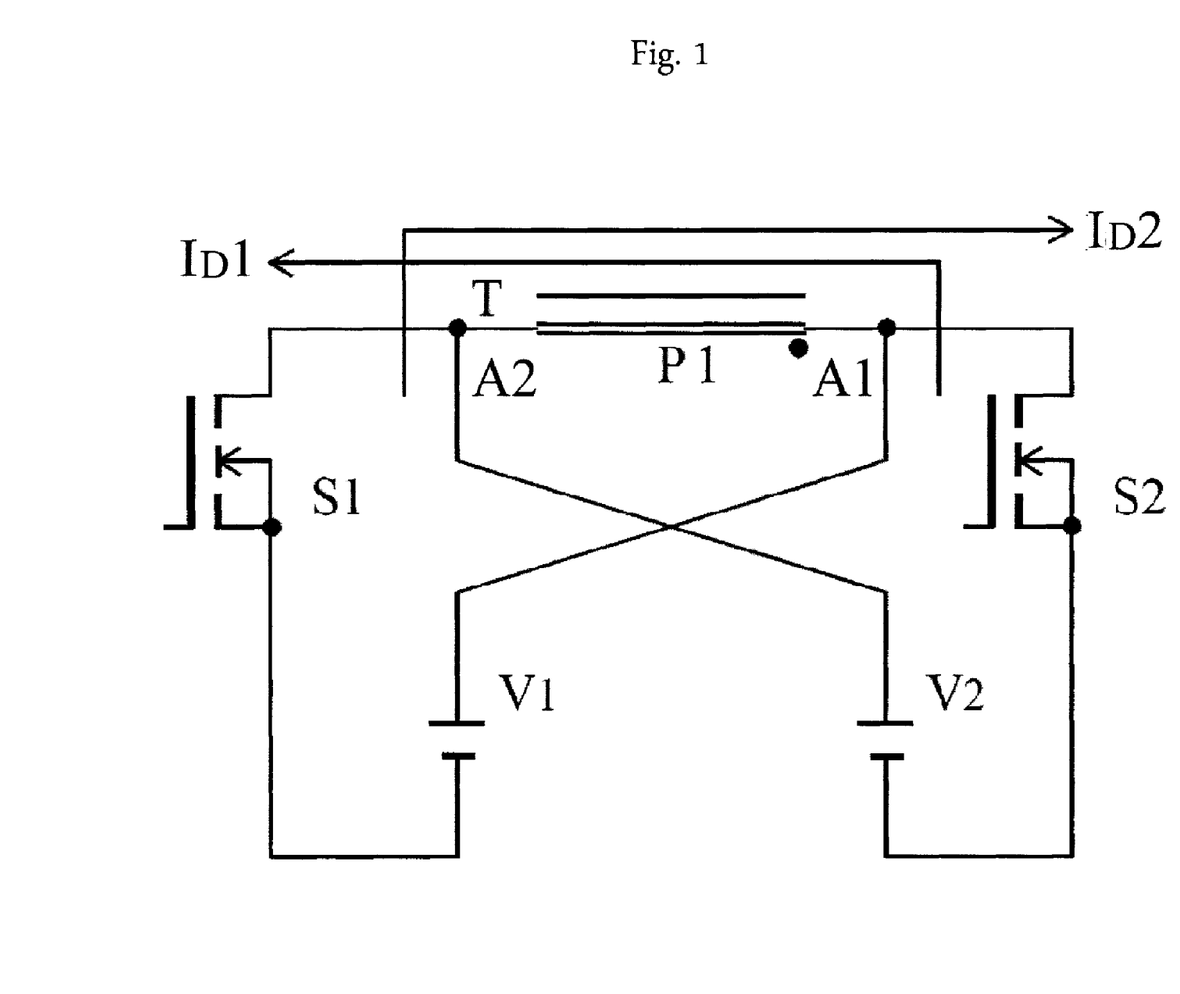
FIG. 1 is a figure showing the basic concept of a current balanced push pull type (current balanced PP type) inverter circuit which is used in the DC-DC converter circuit of the present invention.

The inverter circuit used in the DC-DC converter circuit of this invention has a basic structure as shown in FIG. 1. This inverter circuit includes, as switching elements, a first switching element S1 and a second switching element S2. These switching elements S1 and S2 are semiconductor switching elements, and for example may be IGBTs (Insulated Gate type Bipolar Transistors) or MOS-FETs. Moreover this inverter circuit includes an output transformer, which is provided with a first primary winding P1 which is connected in series between said first switching element S1 and said second switching element S2, and also with a secondary winding for obtaining an output voltage.

As one example of connection, the first primary winding P1 is connected to the positive electrode sides of both the first switching element S1 and also the second switching element S2. Furthermore, this inverter circuit comprises two voltage sources (in FIG. 1, the voltage sources are shown as being power supplies). The first power supply V1, which is a first voltage source, is connected between a first connection point A1 at which said first primary winding P1 is connected to said second switching element S2, and said first switching element S1. Due to this, the first power supply V1 applies its voltage to said first switching element S1 via said first primary winding P1. And the second power supply V2 is connected between a second connection point A2 at which said first primary winding P1 is connected to said first switching element S1, and said second switching element S2. Due to this, the second power supply V2 applies its voltage to said second switching element S2 via said first primary winding P1.

It should be understood that it would also be possible to connect the first primary winding P1 to the negative electrode sides of both the first switching element S1 and also the second switching element S2.

The control unit performs control to alternately turn said first switching element S1 and said second switching element S2 ON and OFF.

In this specification, an inverter circuit having the above structure is termed a current balanced push pull (current balanced P.P) type inverter circuit.

Figure 2:
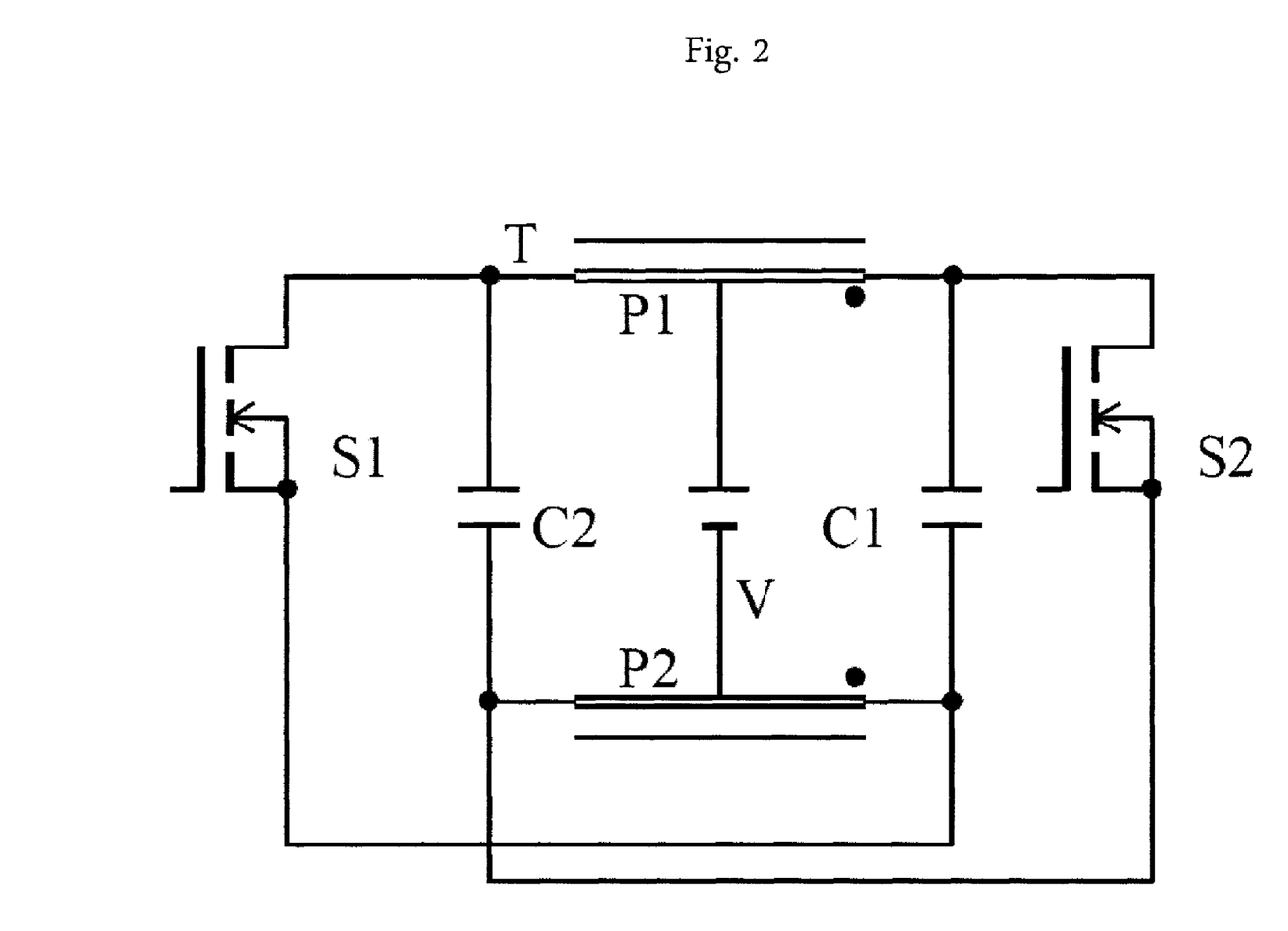
FIG. 2 shows another example of a current balanced push pull type inverter circuit.

As shown in FIG. 2, a variant embodiment of the inverter circuit described above may have the following structure.

That is, the positive electrode side of the first voltage source (in FIG. 2, the capacitor C1) is connected to said first connection point A1, while the positive electrode side of the second voltage source (in FIG. 2, the capacitor C2) is connected to said second connection point A2, and moreover the second primary winding P2 is provided as being connected between the negative electrode side of said first voltage source and the negative electrode side of said second voltage source. Furthermore, the power supply V is provided so as to be connected between a center tap of said first primary winding P1 and a center tap of said second primary winding P2, and so as to supply energy to said first and second voltage sources via said first primary winding P1 and said second primary winding P2.

With the structure described above, a charging current always flows (i.e. energy is supplied) from the power supply V to the first voltage source and the second voltage source. When the first switching element S1 is turned ON, the current component which flows from the first voltage source via the first primary winding P1 to the first switching element S1 and the current component which flows from the second voltage source via the second primary winding P2 to the first switching element S1 are combined together, and this combined current flows to the first switching element S1. To put this in another manner, the current which flows in the first switching element S1 is divided (shunted) between the first primary winding P1 and the second primary winding P2.

The DC-DC converter circuit of the present invention makes ZVS (Zero Voltage Switching) operation possible by incorporating a snubber circuit, and also, makes it possible to reduce losses by incorporating a regeneration circuit.

The regeneration circuit described above includes a resonant section which, during regeneration, causes a snubber capacitor to resonate, and a voltage boost section. This resonant section comprises a resonant reactor. And the voltage boost section comprises a secondary winding (a voltage boost winding) which converts the input voltage of the output transformer (an intermediate voltage) to a predetermined voltage, which it outputs. By making the predetermined voltage greater than or equal to (½) E (where the voltage of the voltage source is termed E), it is possible to regenerate all of the charge in the snubber capacitor.

Effects of the Invention

According to the present invention two switching elements suffice and also the values of the currents which flow in these switching elements are low, and moreover no excessively great surge voltage is applied to the switching elements. Furthermore, by connecting the snubber circuit and the regeneration circuit, the switching elements are enabled to perform ZVS operation, and moreover it is possible to reduce the losses.

EXPLANATION OF REFERENCE NUMBERS

C1: capacitor, being a first voltage source
C2: capacitor, being a second voltage source
V: power supply
S1: first switching element
S2: second switching element
P1: first primary winding
P2: second primary winding
INV: inverter circuit
SN1: first regeneration snubber circuit
SN2: second regeneration snubber circuit
C3, C5, C4, C6: snubber capacitors
L1, L2, L3, L: resonant reactors
S3, S4, S5, S6: voltage boost windings
OUT: output circuit

BEST MODE FOR CARRYING OUT THE INVENTION

FIG. 1 is a figure showing the basic concept of a current balanced push pull type (current balanced PP type) inverter circuit which is used in the DC-DC converter circuit of the present invention.

This inverter circuit comprises a first switching element S1, a second switching element S2, and an output transformer (not shown in the drawings) which has a first primary winding P1 connected in series between the first switching element S1 and the second switching element S2, and also has a secondary winding for obtaining an output voltage.

Moreover, this inverter circuit comprises a first power supply V1 which is connected between a first connection point A1 at which the first primary winding P1 is connected to the second switching element S2 and the first switching element S1, and which applies voltage to the first switching element S1 via the first primary winding P1, and a second power supply V2 which is connected between a second connection point A2 at which the first primary winding P1 is connected to the first switching element S1 and the second switching element S2, and which applies voltage to the second switching element S2 via the first primary winding P1.

The first switching element S1 and the second switching element S2 are alternately turned ON and OFF by a control unit (not shown in the drawings).

With the inverter circuit described above, when the first switching element S1 is ON, a current $I_D1$ flows from the first power supply V1 in the first primary winding P1 in the leftward direction, and, when the second switching element S2 is ON, a current $I_D2$ flows from the second power supply V2 in the first primary winding P1 in the rightward direction. And, by turning the first switching element S1 and the second switching element S2 alternately ON and OFF, an AC output voltage is generated in the secondary winding of the transformer, because the current $I_D1$ and the current $I_D2$ flow alternately in the first primary winding P1.

FIG. 2 shows another example of an inverter circuit. This inverter circuit uses two primary windings.

In this inverter circuit, the first power supply V1 of FIG. 1 is replaced by a capacitor C1 which constitutes a first voltage source, and the second power supply V2 of FIG. 1 is replaced by a capacitor C2 which constitutes a second voltage source.

Moreover, a second primary winding P2 is connected between the negative electrode side of the first voltage source C1 and the negative electrode side of the second voltage source C2.

Furthermore, between a center tap of the first primary winding P1 and a center tap of the second primary winding P2, there is provided a power supply V which supplies energy to the first voltage source C1 and the second voltage source C2 via the first primary winding P1 and the second primary winding P2.

Figure 3:
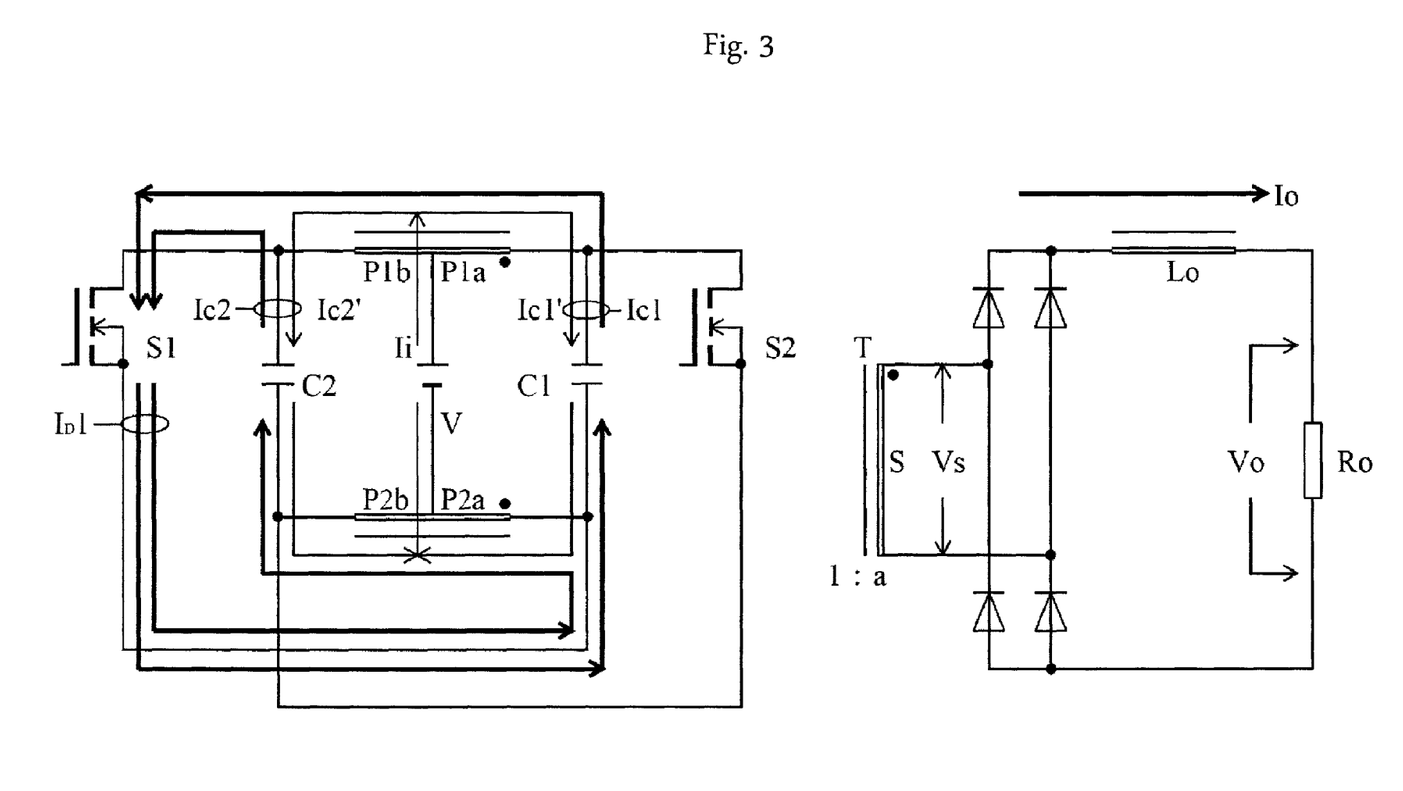
FIG. 3 is a figure for explanation of the operation of this inverter circuit.
Figure 4:
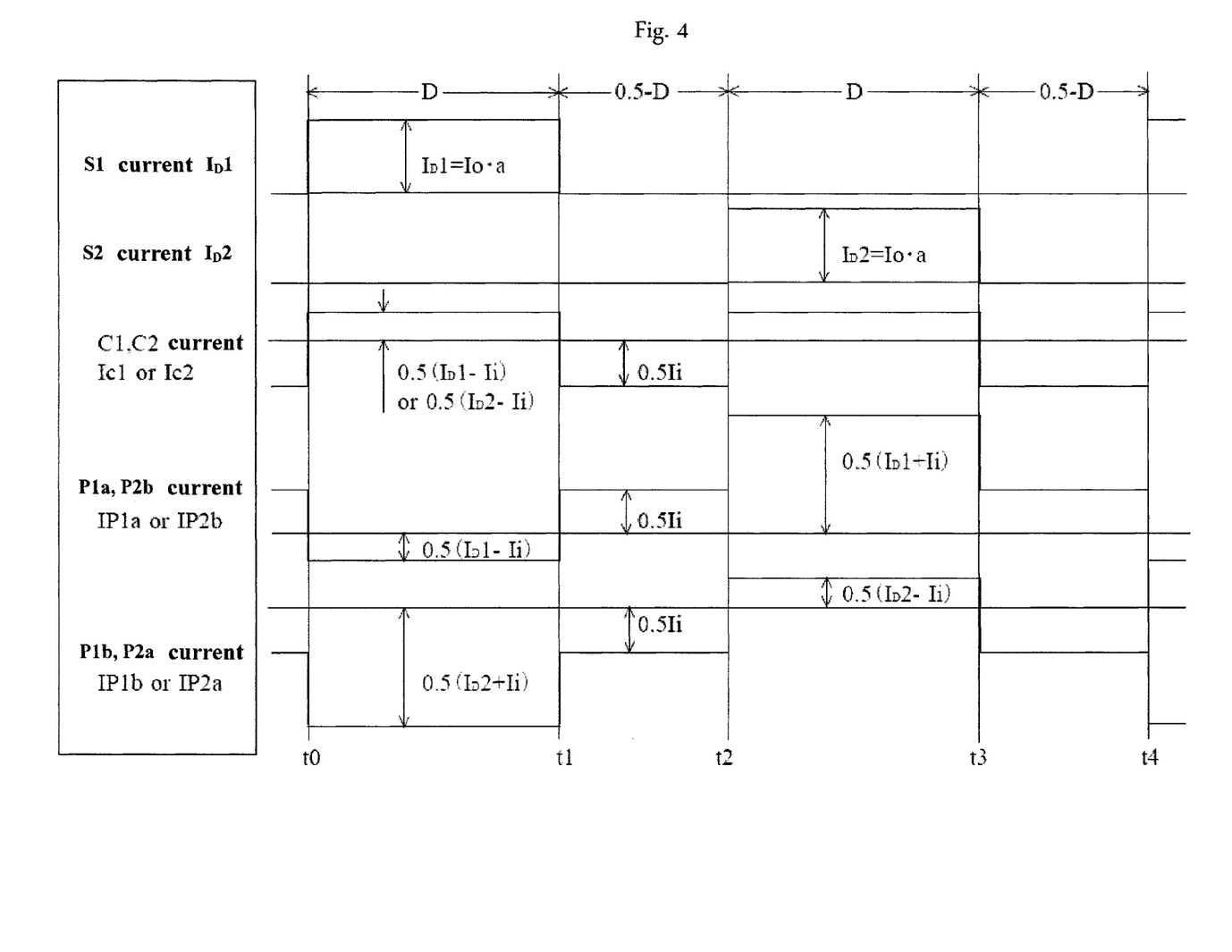
FIG. 4 is a time chart for this inverter circuit.

FIG. 3 is a figure for explanation of the operation of the inverter circuit described above, and FIG. 4 is a time chart. In FIG. 4, the interval D is an interval during which the first switching element S1 or the second switching element S2 is turned ON. Here, the maximum value of this interval D is 0.5. The interval (0.5-D) is the inactive interval in which both of the switching elements S1 and S2 are turned OFF.

In FIG. 3, the first primary winding P1 consists of windings P1a and P1b centered around a center tap, and the second primary winding P2 consists of windings P2a and P2b centered around a center tap. It should be understood that, as a whole, a DC-DC converter circuit is constituted by a diode bridge rectification circuit being connected to the secondary winding S of this transformer T, and moreover the rectified output is connected to a smoothing reactor $L_0$ and a load $R_0$. The other structures are the same as in FIG. 2.

When the first switching element S1 is turned ON, so that a voltage V is applied both to the first primary winding P1 and also to the second primary winding P2 by the capacitor C1 which is a first voltage source and the capacitor C2 which is a second voltage source, and thus an output voltage Vs is generated in the secondary winding S, an output current $I_0$ flows in the load $R_0$. Due to this, $0.5\ I_0 \cdot a$ flows in each of the primary windings P1 and P2 (the winding ratio of the transformer is 1:a). At this time the element current $I_D1$, which is a combination of the current which flows from the capacitor C1 to the switching element S1 and the current which flows from the capacitor C2 to the switching element S2, is:

$$I_D1 = I0 \cdot a$$

Each of the (DC) charging currents Ic1' and Ic2' for the capacitors C1 and C2 is half of the value Ii obtained by dividing the output electrical power by the power supply voltage (i.e. is 0.5 Ii). Accordingly, the combined currents Ic1 and Ic2 which flow in the capacitors C1 and C2 are each equal to (the discharge current−the charging current)=$0.5(I_D1-Ii)$.

On the other hand, the currents which flow in the primary windings P1a and P2b are obtained by the charging currents being subtracted, while the currents which flow in the primary windings P1b and P2a are obtained by the charging currents being added.

In other words:

$$IP1a, Ip2b = 0.5(I_D1 - Ii)$$

$$IP1b, Ip2a = 0.5(I_D1 + Ii)$$

There is no problem with this current imbalance. The reason why is that equilibrium of the average winding currents is preserved by the switching elements S1 and S2 being turned alternately ON and OFF (i.e. by commutating them). Accordingly, in particular, no problem occurs with regard to the core of the transformer becoming magnetized.

Furthermore, as seen from the power supply V, the polarities of the various windings P1a, P1b, P2a, and P2b are respectively reversed. Due to this, the transformer T is not directly excited by the power supply voltage. Moreover, since the charging currents Ic1' and Ic2' which respectively flow in the primary windings P1 and P2 are in opposite directions, accordingly there is also no problem of the core becoming DC magnetized.

With the structure described above, the alternating voltage which is supplied to both the first primary winding P1 and the second primary winding P2 becomes the power supply voltage V, and this is the same as with the full bridge type. Moreover, the center taps which are provided upon the first primary winding P1 and the second primary winding P2 are used for energy supply from the power supply V, and, due to current flowing as shown by the thick line in FIG. 3, all of the first primary winding P1 and the second primary winding P2 are utilized for output power supply. Because of this, there is no occurrence of free winding each half cycle, as with the center tap push pull type. In other words, it is not necessary to give any consideration to leakage inductance between P1a and P1b, and between P2a and P2b, and, due to this, no surge voltage is generated during current changeover. Accordingly, it is not necessary to provide close coupling between P1a and P1b and between P2a and P2b, with the objective of preventing surge voltage. Moreover, a charging current of 0.5 Ii always flows from the power supply V to the capacitors C1 and C2 via the first primary winding P1 and the second primary winding P2. During this charging process, the current Ii supplied from the power supply V becomes continuous DC, since the leakage inductance between those windings P1 and P2 functions as a filter to eliminate the ripple component. Due to this, as the power supply V, it is possible to use a battery, for example a fuel cell, which has an aversion to ripple component (i.e. whose life characteristic is deteriorated by a ripple component). It should be understood that it must be ensured that the coupling between the first primary winding P1 and the secondary winding S, and the coupling between the second primary winding P2 and the secondary winding S, is symmetric, since it is necessary to equalize the current division.

FIG. 5 is a figure showing the concepts of various inverter circuits: a full bridge type, a half bridge type, a center tap push pull type, and a current balanced push pull type.

As explained above, with a current balanced push pull type inverter circuit, there are the advantages that two switching elements suffice, and the current which flows in the switching elements is only half, as compared with the half bridge type; and, moreover, no excessively great surge voltage is applied to the switching elements. Furthermore, for the power supply V, it is possible to use a battery, for example a fuel cell, which has an aversion to ripple component (i.e. whose life characteristic is deteriorated by a ripple component).

Next, a DC-DC converter circuit according to a first embodiment of this invention will be described.

Figure 6:
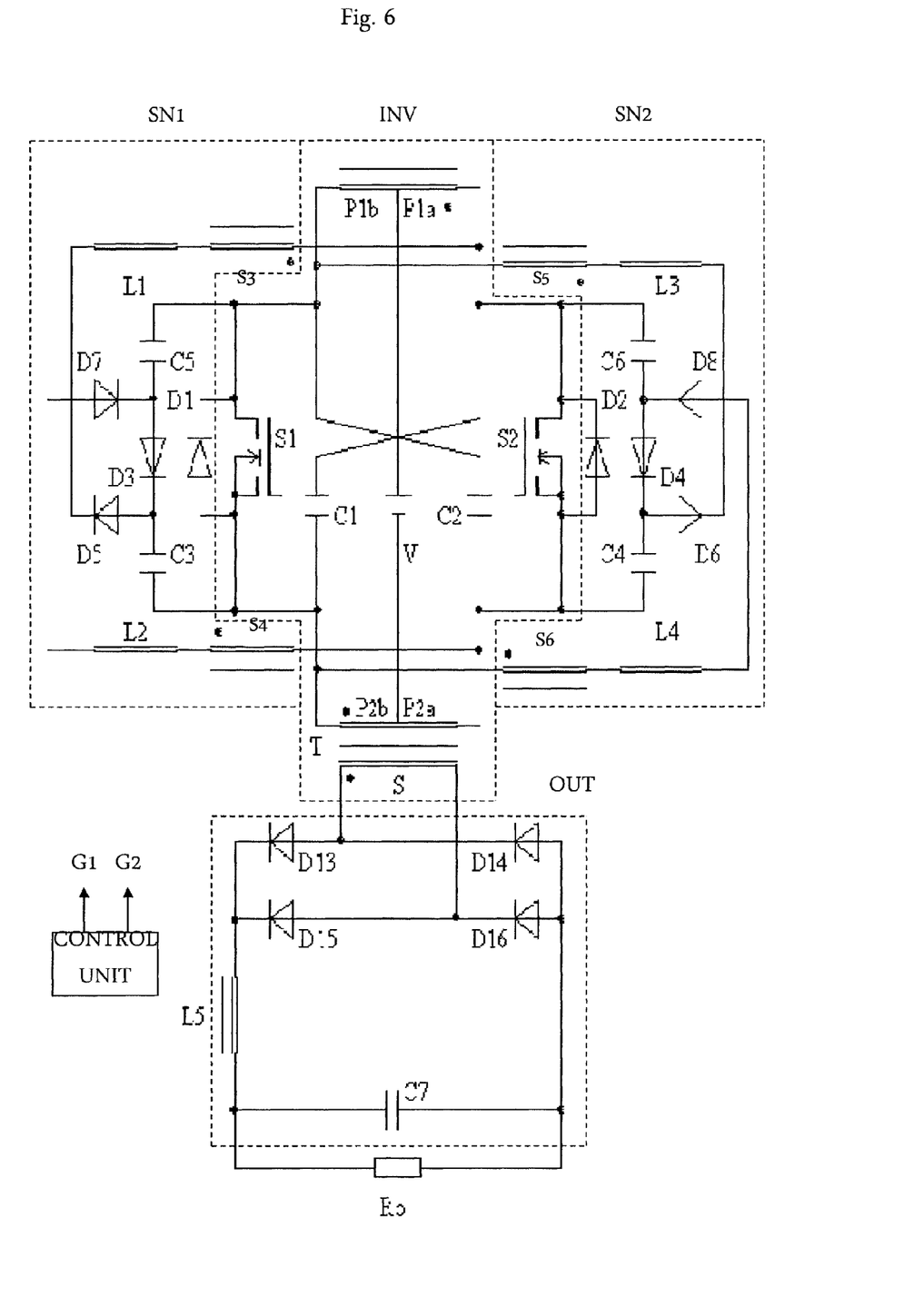
FIG. 6 is a circuit diagram of a DC-DC converter circuit which is a first embodiment of the present invention.
Figure 7:
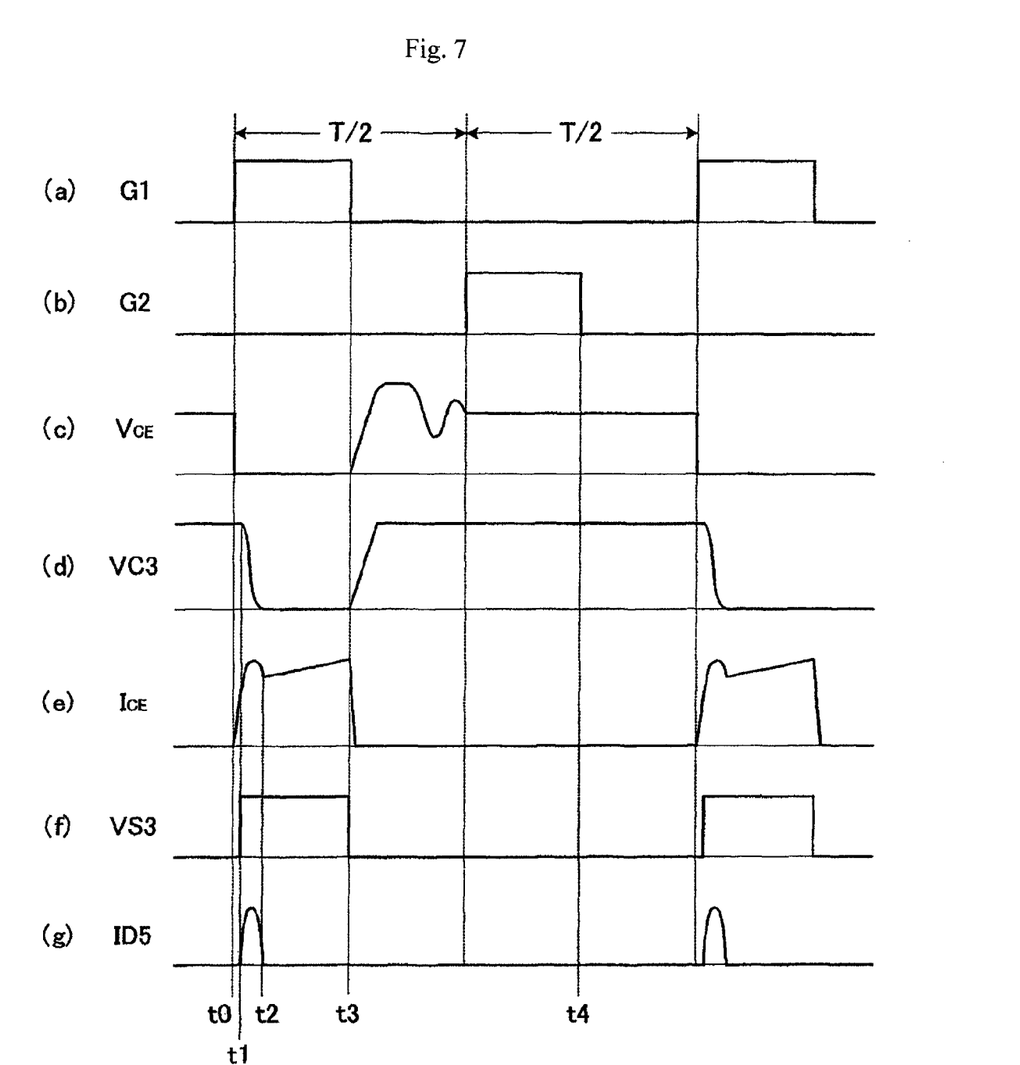
FIG. 7 is a time chart of this DC-DC converter circuit.

FIG. 6 is a circuit diagram of this DC-DC converter circuit. And FIG. 7 is a time chart.

This converter circuit comprises a current balanced push pull type inverter circuit INV, an output circuit OUT which rectifies the AC output of this inverter circuit INV and outputs it to a load, a first regeneration snubber circuit SN1, and a second regeneration snubber circuit SN2.

The inverter circuit INV is the same as the circuit shown in FIG. 2 or FIG. 3 (in FIG. 6 and FIG. 3, the positions in which the capacitors C1 and C2 are shown are mutually opposite). The first regeneration snubber circuit SN1 is connected to the first switching element S1 of the inverter circuit INV, while the second regeneration snubber circuit SN2 is connected to the second switching element S2 of the inverter circuit INV. It should be understood that semiconductor switching elements, for example IGBTs or MOS-FETs or the like, are used for the first switching element S1 and the second switching element S2.

The output circuit OUT comprises current adjustment diodes D13 through D16 which are connected to the secondary winding S of the transformer T, and a reactor L5 and a capacitor C7 for smoothing, and a load $R_O$ is connected to this output circuit OUT.

The first regeneration snubber circuit SN1 comprises a first free wheel diode D1 which is connected in reverse parallel with the switching element S1, and a first snubber circuit which is connected in parallel with the switching element S1. The first snubber circuit includes a series circuit of a first snubber diode D3, a first snubber capacitor C3, and a second snubber capacitor C5. Moreover, the first regeneration snubber circuit SN1 is connected to said first snubber circuit, and comprises a first regeneration circuit which consists of a first regeneration section and a second regeneration section.

This first regeneration section included in the first regeneration circuit is connected between the positive electrode side of the capacitor C1, which is a first voltage source, and the snubber capacitor C3. In other words, this first regeneration section comprises a series circuit of a regeneration diode D5 for blocking charging, a resonant reactor L1, and a voltage boost winding S3. The resonant reactor L1 resonates with the capacitor C3 during regeneration, and the voltage boost winding S3 converts the primary side voltage of the output transformer S and outputs a predetermined voltage. As described hereinafter, the number of windings on the voltage boost winding S3 is determined so that, when the potential of the capacitor C1, which is the first voltage source, is E, said predetermined voltage becomes equal to 0.5 E.

The second regeneration section comprises a series circuit of a regeneration diode D7 for blocking charging, a resonant reactor L1, and a voltage boost winding S4. The resonant reactor L2 resonates with the capacitor C5 during regeneration, and the voltage boost winding S4 converts the primary side voltage of the output transformer S and outputs a predetermined voltage.

The second regeneration snubber circuit SN2 has a circuit structure which is symmetric with that of the first regeneration snubber circuit SN1.

In other words, the second regeneration snubber circuit SN2 comprises a second free wheel diode D2 which is connected in reverse parallel with the switching element S2, and a second snubber circuit which is connected in parallel with the switching element S2. This second snubber circuit includes a series circuit of a second snubber diode D4, a third snubber capacitor C4, and a fourth snubber capacitor C6. Moreover, the second regeneration snubber circuit SN2 is connected to said second snubber circuit, and includes a second regeneration circuit which consists of a third regeneration section and a fourth regeneration section. The third regeneration section included in the second regeneration circuit is connected between the positive electrode side of the capacitor C2, which is a second voltage source, and the snubber capacitor C4. In other words, this third regeneration section comprises a series circuit of a regeneration diode D6 for blocking charging, a resonant reactor L3, and a voltage boost winding S5. The resonant reactor L3 resonates with the capacitor C4 during regeneration, and the voltage boost winding S5 converts the primary side voltage of the output transformer S and outputs a predetermined voltage. As described hereinafter, the number of windings on the voltage boost winding S5 is determined in a similar manner to those of the voltage boost windings S3 and S4, so that said predetermined voltage becomes equal to 0.5 E.

The fourth regeneration section comprises a series circuit of a regeneration diode D8 for blocking charging, a resonant reactor L4, and a voltage boost winding S6. The resonant reactor L4 resonates with the capacitor C6 during regeneration, and the voltage boost winding S6 converts the primary side voltage of the output transformer S and outputs a predetermined voltage.

With the above described first regeneration snubber circuit SN1, the resonant reactor L1 and the resonant reactor L2 constitute the "first resonant section" of the Claims. Moreover, the voltage boost winding S3 and the voltage boost winding S4 constitute the "first voltage boost section" of the Claims.

Moreover, with the first regeneration snubber circuit SN2, the resonant reactor L3 and the resonant reactor L4 constitute the "second resonant section" of the Claims. Moreover, the voltage boost winding S5 and the voltage boost winding S6 constitute the "second voltage boost section" of the Claims.

The converter circuit further includes a control unit CT, and this control unit CT generates gate signals G1 and G2 for ON/OFF controlling the switching elements S1 and S2. These gate signals G1 and G2 are supplied to the gate terminals of the switching elements S1 and S2, respectively.

Next, the operation will be explained with reference to FIG. 7.

The operation of the first snubber circuit and the first regeneration section included in the first regeneration snubber circuit SN1 will now be explained.

Directly before t0, due to the operation of the reactor L5 which is a current source (and which is connected to the secondary side of the transformer T), the diodes D13 through D16 for current adjustment are in the free wheel state. When at t0 the control signal G1 goes to ON and the switching element S1 is turned ON, due to the current reduction operation of the leakage inductances of the primary windings P1 (P1a and P1b) and P2 (P2a and P2b), the current $I_{CE}$ which flows in the switching element S1 increases linearly at a constant slope. Due to this, the switching operation becomes ZCS (Zero Current Switching) operation.

Furthermore, when the switching element S1 is turned OFF at t3, the snubber capacitor C3 is gradually charged up by the energy accumulated in the above described leakage inductance. In the latter half of the charging interval, the change of the charged potential VC3 of the snubber capacitor C3 is determined by the resonant system of the above described leakage inductance and the snubber capacitor C3, and finally is clamped to E (the potential of the capacitor C1 is supposed to be E). It should be understood that, as a result of applying 2E to the series circuit of this snubber capacitor C3 and the snubber capacitor C5 of the second regeneration section, the charged potential of the capacitor C3 is clamped to E. Due to this, application of a surge voltage to the switching element S1 is prevented, and the voltage $V_{CE}$ across the two ends of the switching element S1 gradually rises from t3, as shown in FIG. 7(C). Accordingly, the switching operation becomes ZVS (Zero Voltage Switching) operation.

When the switching element S1 is turned to OFF, the charge which has been accumulated in the snubber capacitor C3 is not consumed by a snubber resistor, as in prior art type circuits, but rather is regenerated to the capacitor C1, which is the first voltage source, in the next interval t1-t2 when the switching element is turned ON. In other words, the charge which has been accumulated in the snubber capacitor C3 is regenerated to the capacitor C1 by the first regeneration circuit which consists of a series circuit of the regeneration diode D5 for blocking charging, the resonant reactor L1, and the voltage boost winding S3.

The details are as follows.

When the switching element S1 is turned ON, the potential 0.5 E of the voltage boost winding S3 is boosted to the charged potential E of the snubber capacitor C3. Due to this, the charge in the snubber capacitor C3 which was charged up to E is regenerated to the capacitor C1 by the resonant circuit of the snubber capacitor C3 and the resonant reactor portion L1.

Figure 8:
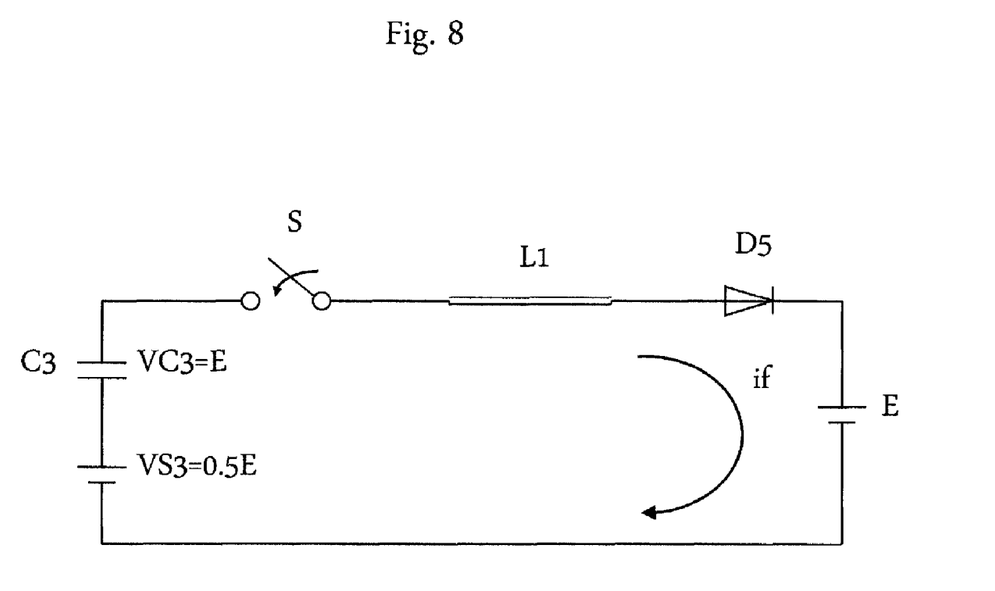
FIG. 8 is an equivalent circuit for a first regeneration circuit during regeneration.

FIG. 8 is an equivalent circuit when the charge in the snubber capacitor C3 is being regenerated by the first regeneration section.

The voltage equation of this equivalent circuit is as in Equation (1):

$$L1(di_f/dt)+(1/C3)\int i_f \cdot dt = L1(d^2q/dt^2)+(1/C3)q=0.5E \quad \text{(Equation 1)}$$

Equation (1) is an ordinary linear differential equation of the second order, and its solution is as below.

$$i_f(t2-t1)=(0.5E/Z_f)\sin \omega_f t \quad \text{(Equation 2)}$$

$$V_{C3}(t2-t1)=0.5E(1+\cos \omega_f t) \quad \text{(Equation 3)}$$

$$V_{L1}(t2-t1)=0.5E \cdot \cos \omega_f t \quad \text{(Equation 4)}$$

Here:
$Z_f = \sqrt{(L1/C3)}$ (characteristic impedance)
$\omega_f = 1/\sqrt{(L1/C3)}$ (angular frequency)

Figure 9:
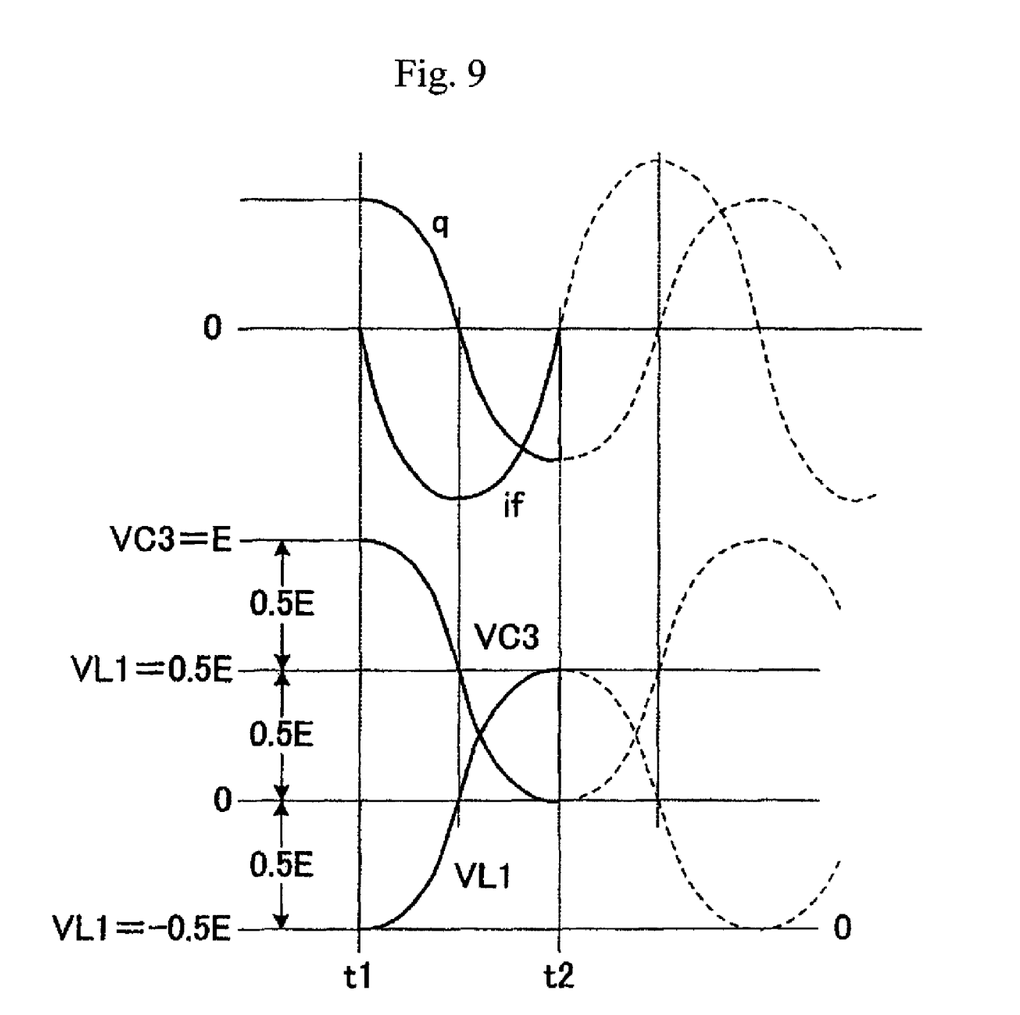
FIG. 9 is a time chart during regeneration.

It should be understood that, due to the regeneration diode D5 for charge blocking, the regeneration current $i_f$ only flows during the interval t1-t2. FIG. 9 shows Equations (2) through (4) in the form of a drawing.

By boosting the potential E charged into the snubber capacitor C3 to E+0.5 E with the voltage boost winding S3 in this manner, it is possible to regenerate all of the charge in the snubber capacitor C3 to the capacitor C1 in the interval t1-t2, since at t2 the potential VC3 becomes zero.

Operation is performed in the second regeneration section as well, in the same way as in the first regeneration section described above, so that, at t2, all of the charge in the snubber capacitor C5 is regenerated into the capacitor C2.

Moreover, the same operation is performed in the second regeneration snubber circuit SN2 as well, as in the first regeneration snubber circuit SN1 described above.

Thus, the charges accumulated in the snubber capacitors C3, C5, C4, and C6 are not consumed by snubber resistors as in prior art snubber circuits, and it is possible to enhance the efficiency of the inverter circuit, since these charges are regenerated into the capacitors C1 and C2. It should be understood that leakage inductances between the primary windings P1 (P1a and P1b) and P2 (P2a and P2b) and the voltage boost windings S3 through S6 may be substituted for the resonant reactors L1 through L4.

Next, a second embodiment of the present invention will be described.

Figure 10:
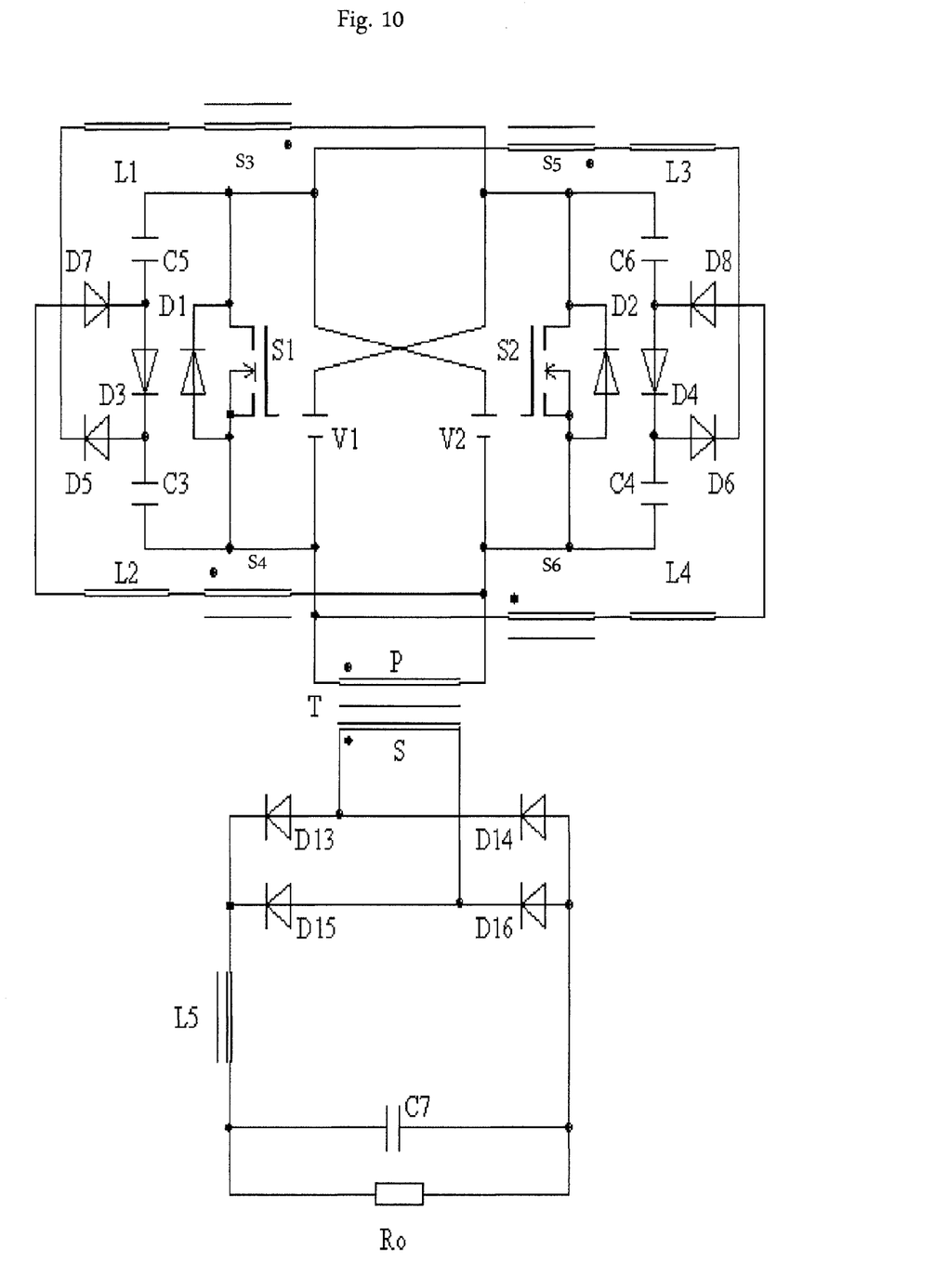
FIG. 10 is a circuit diagram of a DC-DC converter circuit which is a second embodiment of the present invention.

FIG. 10 is a circuit diagram of a DC-DC converter circuit which employs a variant current balanced push pull type inverter circuit.

The points of difference between the circuit of FIG. 10 and the circuit of FIG. 6 are as follows.

(A1) A current balanced push pull type inverter circuit of the structure shown in FIG. 1 is used. In other words, a first power supply V1 and a second power supply V2 are used as the voltage sources, instead of the capacitors C1 and C2. Moreover, as a primary winding, only a first primary winding P is provided. It should be understood that, in this example, the primary winding P shown in the figure corresponds to the "first primary winding P1" of the Claims (accordingly, this primary winding P is connected to the negative electrode sides of the voltage sources V1 and V2).

With this circuit, there is no requirement to provide any center taps upon the primary windings, and moreover one power supply is sufficient.

Next, a third embodiment of this invention will be disclosed.

Figure 11:
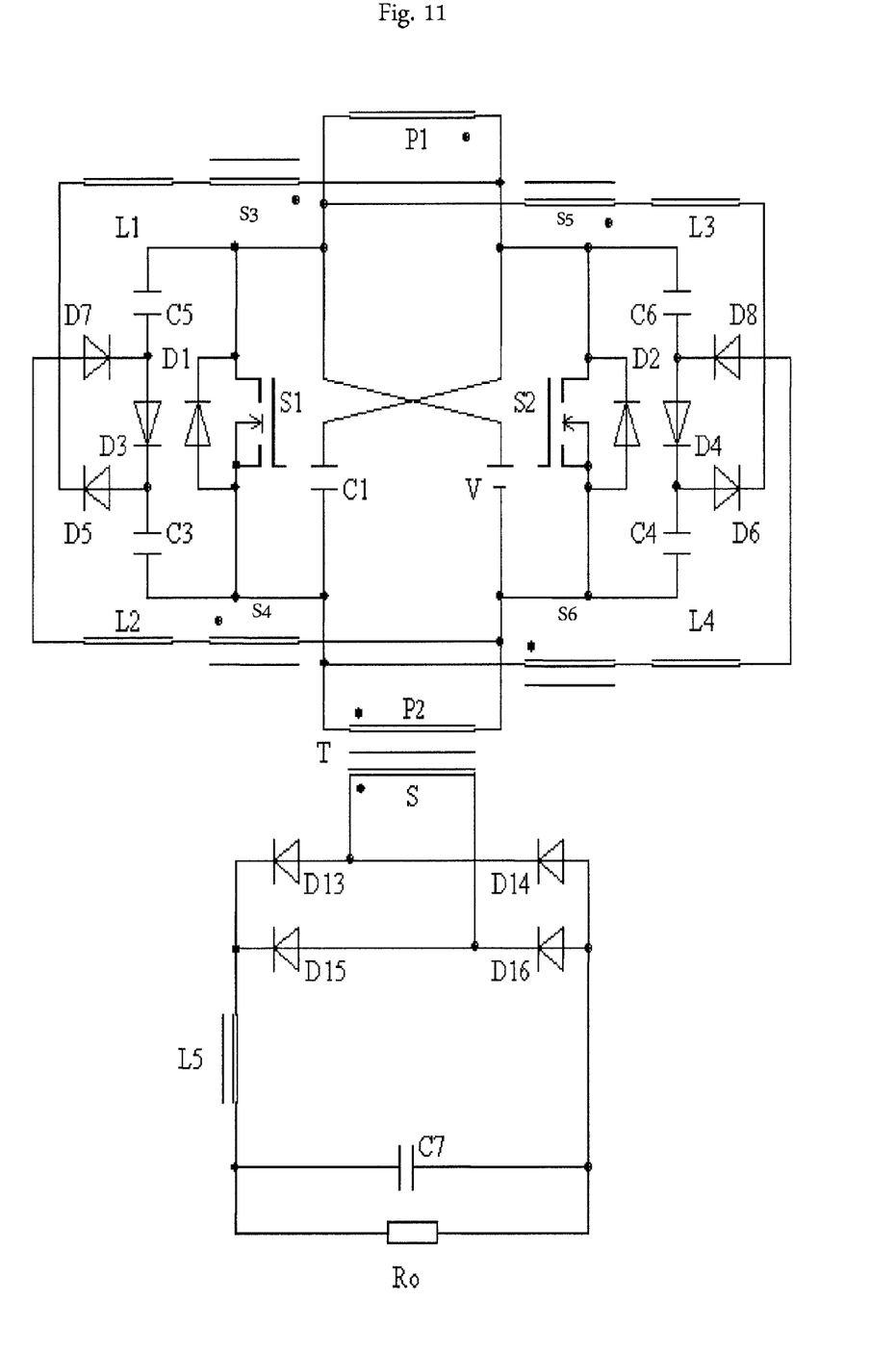
FIG. 11 is a circuit diagram of a DC-DC converter circuit which is a third embodiment of the present invention.

FIG. 11 is a circuit diagram of a DC-DC converter circuit which employs a variant current balanced push pull type inverter circuit.

The points of difference between the circuit of FIG. 11 and the circuit of FIG. 6 are as follows.

(B1) The power supply V is used as a voltage source, instead of the capacitor C2.

(B2) The center taps of the primary windings P1 and P2 are eliminated.

With this circuit, there is no requirement to provide any center taps upon the primary windings, and moreover one power supply is sufficient.

With all of the embodiments described above, the operation is the same as that of the DC-DC converter circuit shown in FIG. 6.

Figure 12:
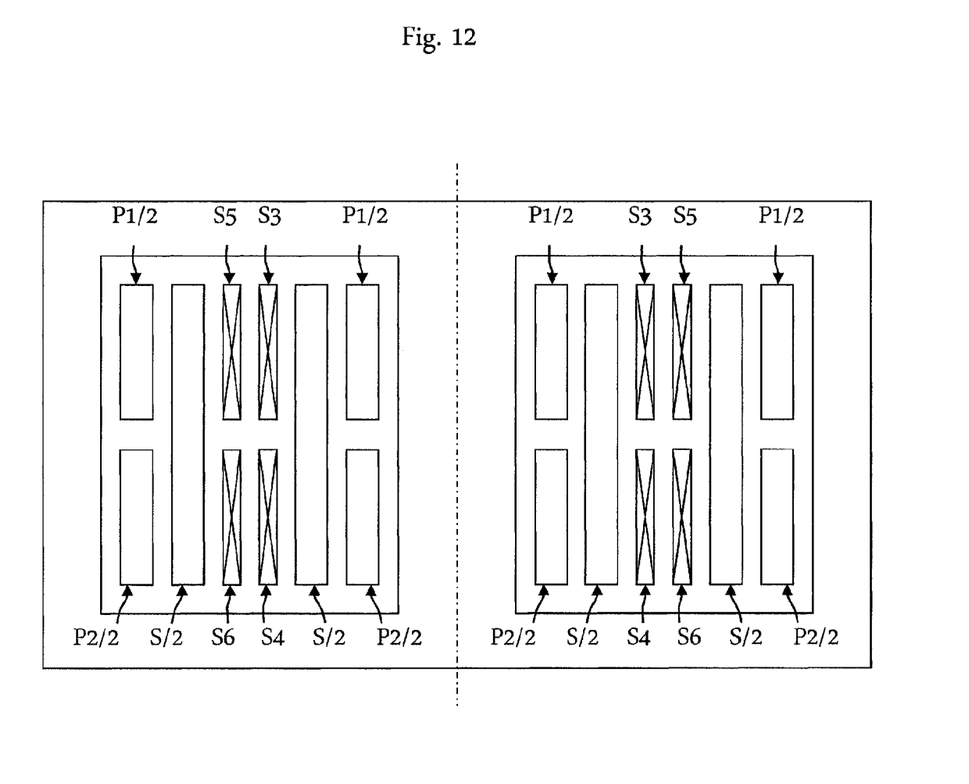
FIG. 12 is a constructional diagram of a transformer.

Next, the construction of the transformer T used in the above embodiments will be explained with reference to FIG. 12.

In this transformer T, half of the primary windings P (P1 and P2), half of the secondary winding S, the voltage boost windings S3 and S4, the voltage boost windings S5 and S6, half of the secondary winding S, and half of the primary windings (P1 and P2) are arranged in that order upon a core form. Due to this construction, the voltage boost windings S3 through S6 do not experience any influence due to magnetic flux leakage between the primary windings P (P1 and P2) and the secondary winding S.

In other words, at the time instant t3 at which the switching element S1 is turned OFF, a resonant voltage is generated in the primary windings P (P1 and P2) due to the leakage inductance between those primary windings and the secondary winding. However, since the secondary winding S is short circuited in the free wheel interval (t3-t5 or t4-t6 in FIG. 7) in which the diodes D13 through D16 for current adjustment are all continuous, accordingly the voltage boost windings S3 through S6 which are closely coupled to the secondary winding S are magnetically constrained in this interval. Accordingly, the above described resonant voltage is not transmitted to the voltage boost windings S3 through S6. As a result unnecessary charging and discharging of the snubber capacitors S3 through S6 is eliminated, so that satisfactory ZVS operation is performed.

The invention claimed is:

1. A DC-DC converter circuit, comprising:
   a first switching element (S1);
   a second switching element (S2);
   an output transformer (T), comprising a first primary winding (P1) which is connected in series between said first switching element (S1) and said second switching element (S2), and also a secondary winding for obtaining an output voltage;
   a smoothing circuit which rectifies and smoothes said output voltage;

a first voltage source, connected between a first connection point at which said first primary winding is connected to said second switching element (S2) and said first switching element (S1), and which applies a voltage to said first switching element (S1) via said first primary winding (P1);

a second voltage source, connected between a second connection point at which said first primary winding is connected to said first switching element (S1) and said second switching element (S2), and which applies a voltage to said second switching element (S2) via said first primary winding;

a control unit which alternately turns said first switching element (S1) and said second switching element (S2) ON and OFF;

a first free wheel diode connected in reverse parallel with said first switching element (S1);

a first snubber circuit connected in parallel with said first switching element (S1), and including a series circuit of a first snubber capacitor, a first snubber diode, and a second snubber capacitor;

a second free wheel diode connected in reverse parallel with said second switching element (S2);

a second snubber circuit connected in parallel with said second switching element (S2), and including a series circuit of a third snubber capacitor, a second snubber diode, and a fourth snubber capacitor;

a first regeneration circuit, connected between said first and second voltage sources and said first snubber circuit, and which, during regeneration, regenerates the charge accumulated in said first snubber capacitor and said second snubber capacitor to said first voltage source and said second voltage source; and a second regeneration circuit, connected between said first and second voltage sources and said second snubber circuit, and which, during regeneration, regenerates the charge accumulated in said third snubber capacitor and said fourth snubber capacitor to said first voltage source and said second voltage source;

wherein, said first regeneration circuit includes a first resonant section which, during regeneration, causes said first snubber capacitor and said second snubber capacitor to resonate, and a first voltage boost section which is connected in series with said first resonant section, and which outputs a predetermined voltage by converting the primary side voltage of said output transformer; and said second regeneration circuit includes a second resonant section which, during regeneration, causes said third snubber capacitor and said fourth snubber capacitor to resonate, and a second voltage boost section which is connected in series with said second resonant section, and which outputs a predetermined voltage by converting the primary side voltage of said output transformer.

2. A DC-DC converter circuit according to claim 1, wherein said first resonant section comprises a first resonant reactor which, during regeneration, resonates with said first snubber capacitor, and a second resonant reactor which, during regeneration, resonates with said second snubber capacitor; said first voltage boost section comprises a first voltage boost winding connected in series with said first resonant reactor, and a second voltage boost winding connected in series with said second resonant reactor;

said second resonant section comprises a third resonant reactor which, during regeneration, resonates with said third snubber capacitor, and a fourth resonant reactor which, during regeneration, resonates with said fourth snubber capacitor; and said second voltage boost section comprises a third voltage boost winding connected in series with said third resonant reactor, and a fourth voltage boost winding connected in series with said fourth resonant reactor.

3. A DC-DC converter circuit according to claim 1, wherein said first voltage source comprises a first power supply, and said second voltage source comprises a second power supply.

4. A DC-DC converter circuit according to claim 1, wherein said first voltage source comprises a first voltage source capacitor and said second voltage source comprises a second voltage source capacitor; and said output transformer comprises a second primary winding (P2) connected in series between said first switching element (S1) and said second switching element (S2), at a position which opposes said first primary winding, taking said first voltage source and said second voltage source as a reference;

and comprising a power supply, connected between center taps of said first primary winding (P1) and said second primary winding (P2), and which supplies energy to said first voltage source capacitor and said second voltage source capacitor via said first primary winding (P1) and said second primary winding (P2).

5. A DC-DC converter circuit according to claim 1, wherein said first voltage source comprises a power supply, and said second voltage source comprises a second voltage source capacitor; and said output transformer comprises a second primary winding (P2) connected in series between said first switching element (S1) and said second switching element (S2), at a position which opposes said first primary winding, taking said power supply and said second voltage source capacitor as a reference.

* * * * *